PULSE BURST GENERATOR EMPLOYING PLURAL LOCKED PAIR TUNNEL DIODE NETWORKS AND DELAY MEANS

Filed March 30, 1964 3 Sheets-Sheet 1

INVENTORS.
WALLACE J. DUNNET and
RAYNOR W. TAYLOR
BY
Spencer E. Olson
ATTORNEY.

INVENTORS.
WALLACE J. DUNNET and
RAYNOR W. TAYLOR
BY
Spencer E. Olson
ATTORNEY.

INVENTORS
WALLACE J. DUNNET and
RAYNOR W. TAYLOR
BY
Spencer E. Olson
ATTORNEY.

3,319,078

PULSE BURST GENERATOR EMPLOYING PLURAL LOCKED PAIR TUNNEL DIODE NETWORKS AND DELAY MEANS

Wallace J. Dunnet, Southboro, and Raynor W. Taylor, Newton Highlands, Mass., assignors to Sylvania Electric Products Inc., a corporation of Delaware Filed Mar. 30, 1964, Ser. No. 355,734
4 Claims. (Cl. 307—88.5)

This invention is concerned with electronic data processing circuitry, and more particularly with a pulse generator operative to produce a plurality of pulses for controlling the performance of logical operations in such circuitry.

A pulse burst generator of the type described herein is one which produces N consecutive pulses of a selected polarity whenever a single control pulse is applied to its input. Such a circuit is extremely useful in many of the control, gating, and timing operations which are so necessary for the proper functioning of a data processing system. For instance, for serially transferring the data word content of one shift register to another requires a shift-out and a shift-in in a plurality of steps equal in number to the number of bits in the word being shifted. Consequently, whenever it is desired to perform this operation, a control pulse activates the generator which, in turn, transfers a plurality of pulses equivalent to the number of word bits to the appropriate registers for controlling the shifting.

Another use is in the multiplication operation which takes place in the arithmetic unit of the system. Multiplication is performed by a continuous sequence of add and shift operations. Thus, the pulse burst generator is enabled at the beginning of the multiplication operation, causing it to produce the required number of pulses necessary for the shifting portion of the operation.

The high speed characteristics of tunnel diodes make them ideally suited for use in electronic data processing systems. Co-pending patent application S.N. 191,632, filed May 1, 1962, now Pat. No. 3,210,568 and also assigned to the assignee of this application describes improvements in tunnel diode, locked pair circuits and the manner in which they are cascaded in order to perform complex logic functions. A system using these techniques of necessity requires a pulse burst generator capable of operating at speeds equally as high as the described locked pair circuits. Hence, any generator using transistors, tubes, or comparatively slowly charging and discharging capacitors is of necessity inapplicable since it does not operate at or near such speeds.

Accordingly, a primary object of the present invention is to provide a pulse burst generator operating at extremely high speeds, and more particularly one operating in the speed range of tunnel diodes. A further object is to provide improvements in locked pair, tunnel diode circuits. Another object is to provide improved data processing techniques.

These and related objects are accomplished in one embodiment of the invention by a tunnel diode pulse burst generator which features a first majority gate to which a train of pulses that includes the control pulse is applied to cause it to transfer the train to both a delay means and an inverter circuit. The delay means is directly connected to a flip-flop circuit, and a second majority gate is connected between the inverter circuit and the same flip-flop. This latter circuit comprises a majority gate connected to an open-ended delay line and is operative to change its state only when both of its inputs receive a pulse of the same polarity. Before the control pulse is applied to the input of the first majority gate, the flip-flop continually generates a sequence of positive pulses; however, when the control pulse is applied, it is both delayed by the delay circuit and at the same time inverted by the inverter circuit and transferred to the flip-flop by the second majority gate, causing the flip-flop to change state and begin to generate a sequence of negative pulses. Accordingly, the negative pulse burst is initiated. The delay means continues to store the control pulse for a time duration equal to the length of time it takes the burst to be generated. The control pulse is then applied to a flip-flop input, causing it to change state and again produce positive pulses. Thus, the sequence of negative pulses comprising the burst is produced.

Other objects, features, and advantages of the invention will become apparent, and its construction and operation better understood, from the following detailed description, read in conjunction with the accompanying drawings, wherein.

*General description*

Figure 1:
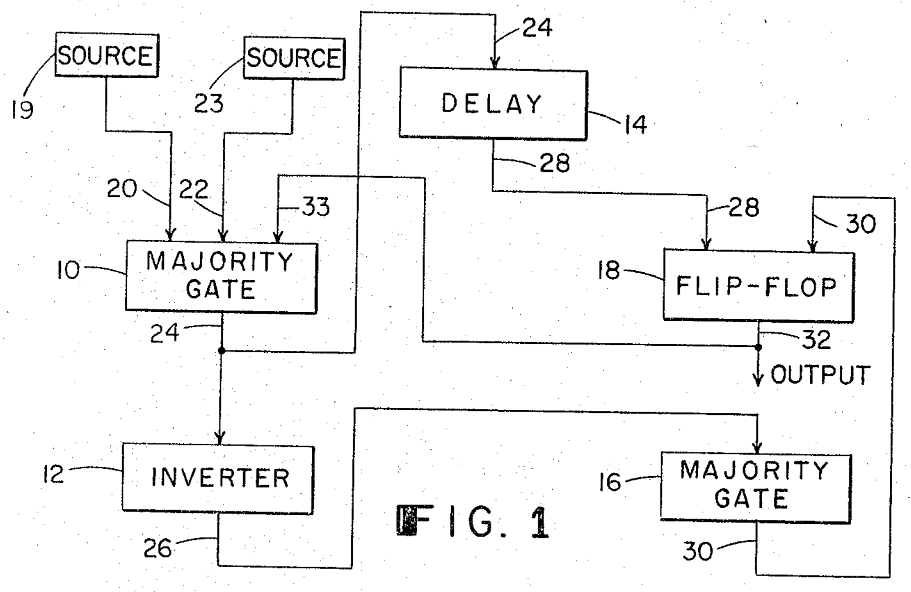
FIG. 1 is a block diagram of a preferred embodiment of the pulse burst generator of the invention.

The pulse burst generator, shown in FIG. 1, produces N consecutive output pulses of a given polarity when a control pulse is applied to line 20. For purposes of the following explanation, N is selected as four and the polarity of the burst pulses is negative. The circuit comprises a pair of input sources 19 and 23 connected to majority gate 10. A delay means 14 is connected between majority gate 10 and flip-flop 18, which produces the pulse burst. A series combination of inverter 12 and majority gate 16 is also connected between majority gate 10 and flip-flop 18, and the output terminal of flip-flop 18 is directly connected to majority gate 10.

Figure 2:
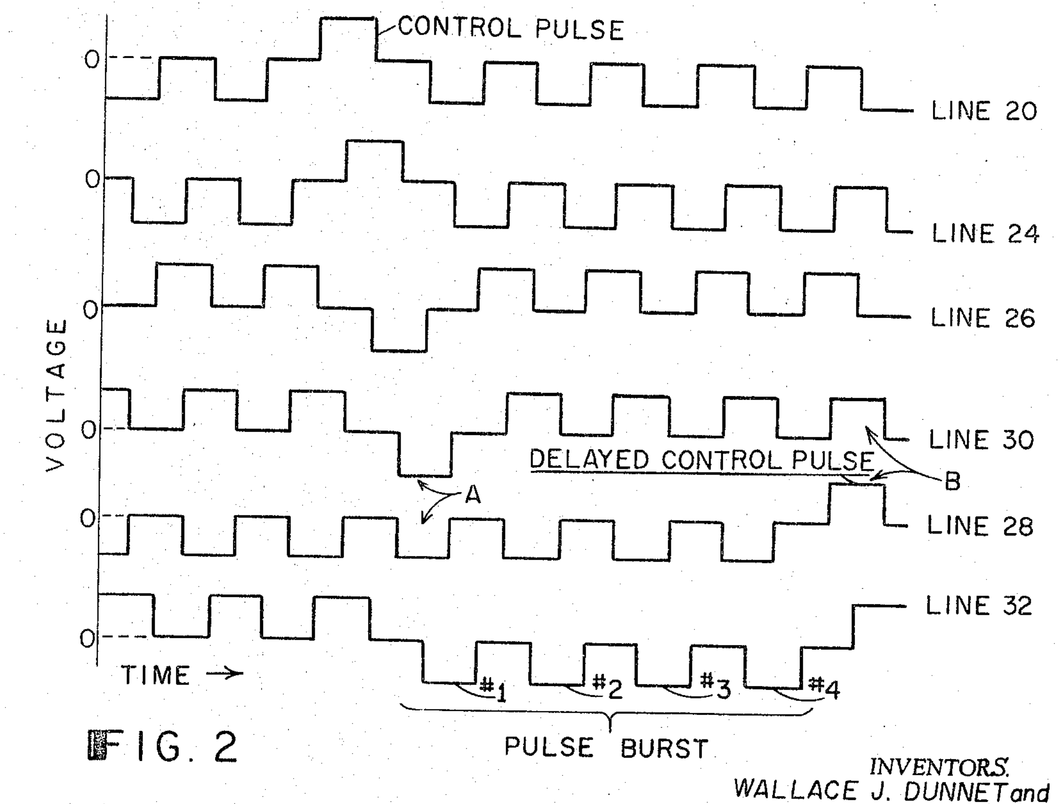
FIG. 2 depicts a series of wave forms produced at various points in the circuit of FIG. 1.

A four-phase sinusoidal voltage supply system (not shown), of the type described in co-pending patent application S.N. 191,502, filed May 1, 1962, and also assigned to the assignee of this application, is utilized to energize these circuits. A polyphase supply system is needed to achieve isolation between the individual circuits because the tunnel diode is a one-port device. Hence, a signal produced by any circuit will attempt to drive both the circuit at its input and that at its output, but the supply system allows it to activate only the latter. Because a four phase supply is used, each of circuits 10, 12, 16, and 18 produces an output which is delayed by 90° with respect to its input. This is demonstrated in FIG. 2 which depicts the waveforms present on the various lines in the circuit of FIG. 1 and will be referred to in the following explanation of the pulse burst generator operation.

It will be assumed that flip-flop 18 initially stores a positive pulse and that no positive control pulse is being received. Hence, a train of negative pulses is applied to line 20 by control pulse source 19, and, additionally, a train of negative pulses which is in synchronism with the control train is applied to line 22. The polarity of the pulses of the latter pulse train is negative at all times during the operation of the pulse burst generator. Accordingly, negative pulses occur on both line 20 and line 22, so that majority gate 10 produces a negative pulse on line 24 because the majority of signals on its inputs 20, 22, and 32 are negative. The pulse generated by gate 10 is applied in parallel to inverter 12 and to delay means 14. Inverter 12 inverts the pulse to produce a positive pulse which is then applied via line 26 to majority gate 16 in which it is delayed by 90° and then transferred via line 30 to one input terminal of flip-flop 18. The negative pulse appearing on line 24 is also delayed a fixed amount by delay means 14 and applied via line 28 to the other input terminal of flip-flop 18. This flip-flop is arranged, as will be described more fully later, to continue to store the same signal when one of its inputs is a negative pulse and the other input is a positive pulse. In order to write a negative pulse into flip-flop 18, negative pulses must be applied to both lines 28 and 30. Similarly, to write a positive pulse, positive pulses must be applied to both input terminals. Hence, flip-flop 18 continues to store the initially stored positive pulse because the pulse on line 28 from delay means 14 is negative and that on line 30 from majority gate 16 is positive, and a positive pulse train is produced on line 32 as long as negative pulses are applied to both inputs 20 and 22 of majority gate 10.

Delay means 14 comprises a delay line having a delay time of a duration that allows the desired number of pulses in the burst to appear on output line 32 of flip-flop 18 before the delayed control pulse is applied to input line 28 to cause flip-flop 18 to reset and end the burst. For an example of the operation of this delay in the circuit of FIG. 1, assume that a positive control pulse is applied to line 20 from source 19. Since a positive pulse from the output of flip-flop 18 is also applied to input 33, majority gate 10 now produces a positive output pulse because the majority of its input signals are positive. This positive pulse is applied in parallel to delay means 14 which stores it until the burst is produced, and to inverter 12 which inverts it to produce a negative pulse. The negative pulse is then transferred to majority gate 16 where it is delayed by 90° and applied to input terminal 30 of flip-flop 18. At this instant the positive control pulse is still being stored by delay line 14 with the result that a negative pulse is applied to input terminal 28. Since both of its inputs are now negative, a negative pulse is produced by flip-flop 18; thus, the first pulse of the negative pulse burst is produced on output line 32 in response to the application of a control pulse to input line 20. This first negative pulse of the burst is also applied to the input terminal 33 of majority gate 10.

Since only one control pulse is used to produce a burst, the next input signal applied to line 20 is again a negative pulse, but actually its polarity is immaterial as both inputs 22 and 33 now have negative signals. The majority of input pulses applied to gate 10 being negative, a negative signal is produced on line 24 which is applied in parallel to both delay means 14 and to inverter 12. The pulse is inverted to a positive pulse by inverter 12 and couples it to majority gate 16 where it is delayed by 90° and then applied to input terminal 30 of flip-flop 18. The control pulse at this point in time is still being delayed by delay means 14 so that a negative pulse is again applied to line 28. Since the input to terminal 28 is negative and the input to terminal 30 is positive, flip-flop 18 again produces a negative signal and the second pulse of the burst is generated. In an identical manner, the third and fourth pulses of the burst are produced.

When the fourth pulse has been produced, all three inputs to terminals 20, 22 and 33 to majority gate 10 are negative, causing it to again produce a negative signal on line 24. This negative pulse is changed to a positive pulse by inverter 12 and transferred via line 26 to majority gate 16 where it is delayed for 90° and applied to input terminal 30 of flip-flop 18. At this time the positive control pulse, which has been delayed in delay line 14 for four pulse periods, is applied to input terminal 28 of the flip-flop. Consequently, both inputs to flip-flop 18 are now positive and a positive signal is produced on line 32, thus ending the negative pulse burst and returning the circuit to initial conditions in anticipation of the next control pulse.

In summary, flip-flop 18 normally generates a train of positive output pulses, but when a positive control pulse is applied from source 19, it causes flip-flop 18 to change its state and begin to generate a train of negative pulses. This control pulse is temporarily stored in delay means 14 until the desired number of pulses which comprise the pulse burst are produced, after which the delayed control signal resets the flip-flop to cause it to again produce a train of positive pulses.

The individual circuits of the pulse burst generator of FIG. 1 will now be described in more detail.

*Majority gate 10*

Figure 3:
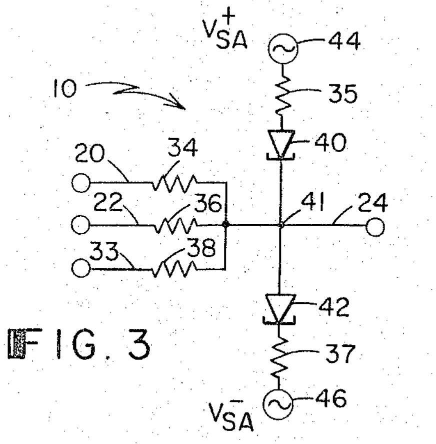
FIG. 3 is a circuit diagram of the majority gate represented by block 10 in FIG. 1.

Majority gate 10, shown in FIG. 3, comprises a locked pair including tunnel diodes 40 and 42 connected together in series relationship at junction 41, a source resistor 35 connected to tunnel diode 40 and to an alternating current voltage source, represented by circle 44, and a source resistor 37 joined to tunnel diode 42 and to an alternating current voltage source, represented by circle 46. Both voltage sources are of the same frequency and are arranged such that their outputs are 180° out of phase with each other. That is, at any instant when the signal at source 44 is in its positive half cycle, the signal at 46 is in its negative half cycle. A half cycle later in time, the "polarities" of the sources would be reversed. The three input terminals 20, 22, and 33 are coupled through resistors 34, 36, and 38, respectively, to the junction 41 of tunnel diodes 40 and 42. An output line 24 is also connected to this junction. Current flows towards junction 41 in those of input lines 20, 22, or 32 to which a positive voltage pulse is applied, and away from the junction 41 if a negative voltage pulse is applied.

For a better understanding of the majority principle and the operation of the circuit of FIG. 3, assume a positive pulse is applied to input terminals 20 and 22 and a negative pulse is applied to line 33, i.e., the majority of inputs is positive. Under these conditions, approximately twice as much current flows towards junction 41 as flows away. The resultant input current flowing into junction 41 divides and flows into tunnel diodes 40 and 42. If at this time source 44 is in its positive half cycle and source 46 in its negative half cycle, the input current flowing into tunnel diode 40 opposes its supply current thereby reducing the total current therethrough. However, the current flowing into tunnel diode 42 adds to its supply current, resulting in unbalance in the currents in the two diodes which causes diode 42 to switch and appear as a high impedance. Diode 40 is thereby prevented from also switching and appears as a low impedance, and the current flow from voltage source 44, through resistor 35, through the low impedance tunnel diode 40, and out on line 24, produces a positive pulse on line 24. Thus, in terms of voltage, if the majority of input voltage pulses are positive, a positive voltage pulse is produced on output line 24.

If, however, negative pulses are applied to input terminals 20 and 22 and a positive pulse is applied to terminal 33, so that the majority of inputs is negative, the resultant input current is drawn from voltage sources 44 and 46 through tunnel diodes 40 and 42. Assuming the same relative polarities of the source voltages as before, the total current flow through tunnel diode 40 increases and the total current through tunnel diode 42 decreases. This current unbalance causes tunnel diode 40 to switch and appear as a high impedance, and tunnel diode 42 is prevented from switching and provides a low impedance. Output current flows from output line 24 through low impedance tunnel diode 42, through source resistor 37, to voltage source 46. Accordingly, when the majority of input pulses are negative, a negative voltage pulse appears on output line 24.

*Inverter 12*

Figure 4:
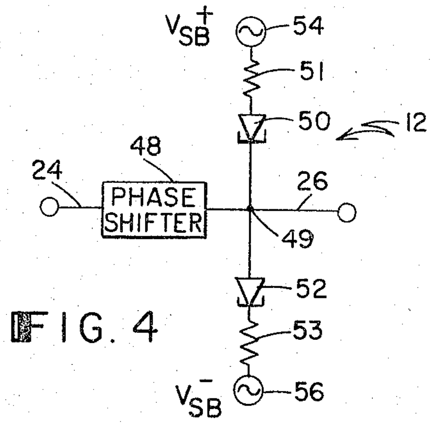
FIG. 4 is a circuit diagram of the inverter stage of the circuit of FIG. 1.

Inverter 12, shown in FIG. 4, comprises a locked pair including tunnel diodes 50 and 52 connected in series relationship and joined at junction 49, a source resistor 51 connected between tunnel diode 50 and an alternating current voltage source, represented by circle 54, and source resistor 53 connected between tunnel diode 52 and an alternating current voltage source, represented by circle 56. The voltage sources are of the same frequency but are 180° out of phase with each other. If a four phase system is used for the pulse burst generator of FIG. 1, as described earlier, sources 54 and 56 are each 90° out of phase with its corresponding source 44 and 46, respectively, in the majority gate of FIG. 3. A phase shifting means 48 is connected between input line 24 (corresponding to the output line of the majority gate) and junction 49, to which the output line 26 is also connected. The construction and operation of this inverter circuit is more fully described in the above-mentioned co-pending application S.N. 191,502. Phase shifting means 48, may comprise a T-filter network of two capacitors and an inductor, but it will be appreciated that other means may be used, some of which are described in said co-pending application. The purpose of the phase shifter is to effectively invert the current pulse appearing on line 24 before application to the junction of tunnel diodes 50 and 52. This has the effect of causing switching of the tunnel diode opposite to the one which would have switched had there been no inversion. Consequently, the operation of the inverter 12 is the reverse of that of majority gate 10 in that if a positive signal is applied to input line 24, current in this line flows out of junction 49, adding to the current through tunnel diode 50 and subtracting from the current through tunnel diode 52. This causes tunnel diode 50 to switch, which, in turn, prevents switching of tunnel diode 52. A negative pulse appears on line 26 since output current flows through the low impedance diode 52 to source 56. Conversely, if a negative pulse is applied to line 24 so that the input current flows towards junction 49 when the tunnel diodes 50 and 52 are about to change states, tunnel diode 52 switches, causing output current to flow from source 54, through tunnel diode 50, and produces a positive pulse on line 26. Thus, because of the current inversion property of phase shifter 48, the polarity of the pulse generated on output line 26 is the inverse of that applied to line 24.

*Delay means 14*

Delay means 14 comprises a delay line capable of storing the control pulse for the duration of the desired pulse burst and thereafter applying it to flip-flop 18 to cause the latter to reset and again generate positive pulses. In the example chosen for description, the delay time is four pulse periods, but it will be apparent that the number of pulses in a burst can be changed by selectively choosing the length of delay means 14 to equal 180° $(2N+1)$, where N is the desired number of pulses in the burst.

*Majority gate 16*

Figure 5:
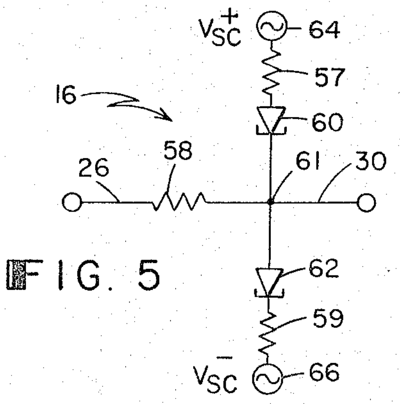
FIG. 5 is a circuit diagram of the majority gate represented by block 16 in FIG. 1.

Majority gate 16, shown in FIG. 5, comprises a single input line 26 coupled by resistor 58 to the common junction 61 of tunnel diodes 60 and 62 and output line 30. Tunnel diode 60 is connected via source resistor 57 to alternating current voltage source 64, and resistor 59 connects a similar voltage source 66 to tunnel diode 62. The output voltages of the sources are of the same frequency but 180° out of phase with each other, and each is 90° out of phase with its corresponding source 54 or 56 in the inverter of FIG. 4.

Majority circuit 16 functions in the same manner as majority circuit 10. A positive signal applied to input line 26 switches tunnel diode 62, causing a positive output signal to be generated, whereas a negative signal applied to line 26 switches tunnel diode 60 so as to generate a negative signal on output line 30. Consequently, the output signal is always of the same polarity as the input signal but delayed by 90° due to the four phase supply system used.

*Flip-flop 18*

Figure 6:
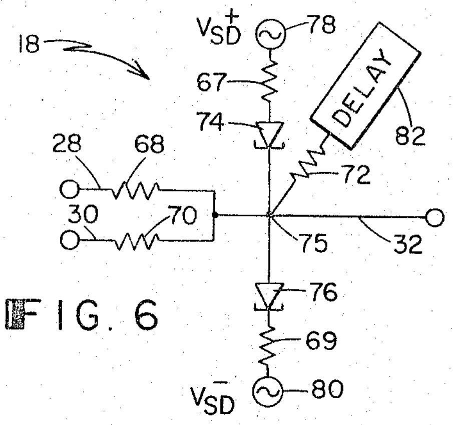
FIG. 6 is a circuit diagram of the flip-flop stage of the circuit of FIG. 1.

Flip-flop 18, shown in FIG. 6, comprises a locked pair including tunnel diodes 74 and 76 joined at junction 75 and connected in series with respective source resistors 67 and 69 between alternating current voltage sources 78 and 80. Both sources are of the same frequency but 180° out of phase with each other, and each is 90° out of phase with its corresponding source 64 or 66 of the majority gate of FIG. 5. Input terminals 28 and 30 are connected to junction 75 via resistors 68 and 70, respectively. Also connected to the junction is an output line 32, and via resistor 72, delay means 82.

It being impossible to store information in a locked pair circuit because of the logic element being periodically turned off and on by the sinusoidal voltage sources, the same or alternative information must be written into the circuit during the period following the active period of the logic element.

Neglecting for the moment the effect of delay line 82, when positive pulses are applied to both input terminals 28 and 30, tunnel diode 76 switches to produce a positive pulse at junction 75, as explained above in connection with majority gate 10, and when both inputs 28 and 30 receive negative pulses, tunnel diode 74 switches to produce a negative signal at junction 75. However, if the pulse applied to input 28 is positive and the input to terminal 30 negative, the resultant input current will be zero and neither tunnel diode will be able to switch.

Delay means 82 may be an open-ended transmission line of such a length that a signal at junction 75 will travel down the line and back again and reappear at junction 75 at the time when the locked pair is in condition to switch again. This is 270° for a four phase system so that the length of the transmission line is 135° $(\frac{1}{2}\times 270°)$. Accordingly, the stored signal returns at the same time as the input signals are applied to inputs 28 and 30 so that delay line 82, in effect, provides a third input.

Flip-flop 18 operates on a majority principle. In order to store in the circuit a signal opposite in polarity to that which is presently being stored, pulses of the desired polarity are applied to both inputs 28 and 30; i.e., a majority of the inputs are of the desired polarity. However, to retain the same signal in the circuit, it is necessary that one input receives a positive pulse and the other a negative pulse so as to permit the stored pulse to determine the polarity of the input majority and, consequently, the polarity of the signal at junction 75. This may be shown as follows: The resultant current into junction 75 from input lines 28 and 30 is zero since the current flowing towards it due to the positive pulse subtracts from that flowing out due to the negative pulse. Consequently, the signal stored in delay line 82 determines whether a positive pulse or a negative pulse is produced at junction 75. If the stored pulse is positive, tunnel diode 76 switches and a positive pulse is produced; if it is negative, tunnel diode 74 switches and a negative pulse is produced.

Referring again to FIGS. 1 and 2, the above-described circuits interact to normally produce a train of positive pulses on output line 32, and in response to a positive control signal from source 19, produce a burst of four negative pulses. Under normal conditions, trains of time-coincident negative pulses are applied to input terminals 20 and 22 of majority gate 10, and positive pulses from flip-flop 18 are applied to input terminal 33. In response to these inputs, majority gate 10 generates on line 24 a series of negative pulses delayed 90° in time with respect to the input pulses. This train of negative pulses is inerted and delayed an additional 90° by inverter 12 to roduce a train of positive pulses on line 26, which are, ι turn, transferred to majority gate 16 where they are elayed another 90° prior to application to input 30 of ip-flop 18. At this instant in time, flip-flop 18 is storing positive signal, and negative pulses are being applied to ıput 28, with the consequence that the positive pulses pplied to input 30 causes the flip-flop to continue to store he positive signal and generate a train of positive pulses.

When it is desired to initiate a pulse burst, a positive ontrol pulse is applied to input terminal 20 of majority ate 10; now a majority of the input pulses are positive, ausing the gate to produce on output line 24 a positive ule, delayed by 90° relative to the control pulse, which s applied in parallel to delay line 14 and inverter 12. Delay 14 stores this positive pulse for the duration of the ulse burst, in this case, four pulse periods. The positive ulse is inverted and delayed another 90° by inverter 12, nd delayed an additional 90° by majority gate 16 and pplied as a negative pulse to input 30 of flip-flop 18. As indicated at A in FIG. 2, at this time negative pulses re being applied to both inputs of flip-flop 18 because elay line 14 is still storing the positive control pulse. Consequently, flip-flop 18 generates a negative pulse on output line 32, and continues to generate consecutive egative pulses because of the application of negative pulses to both inputs 22 and 33 of majority gate 10. When, however, the fourth pulse of the burst is generated, lelay 14 releases the stored positive control pulse for application to input terminal 28 of flip-flop 18, and since both inputs are now positive (as indicated at B in FIG. 2), this circuit again produces a train of positive pulses and returns the system to its normal condition.

Figure 7:
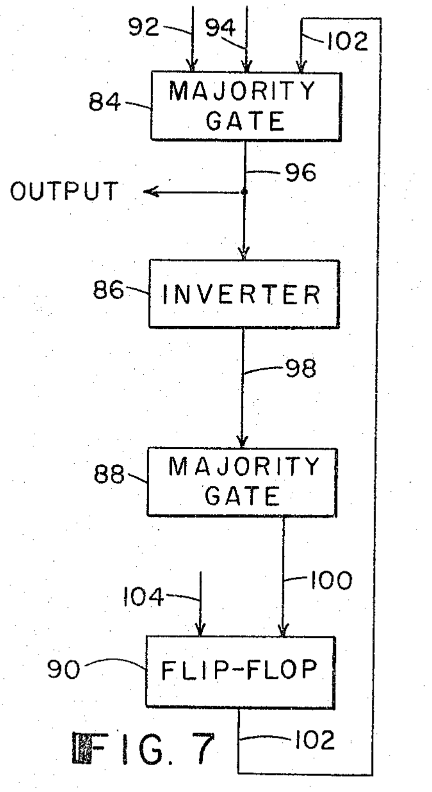
FIG. 7 is an alternative embodiment of the invention operative to produce a single pulse in response to the application of one or more control pulses.
Figure 8:
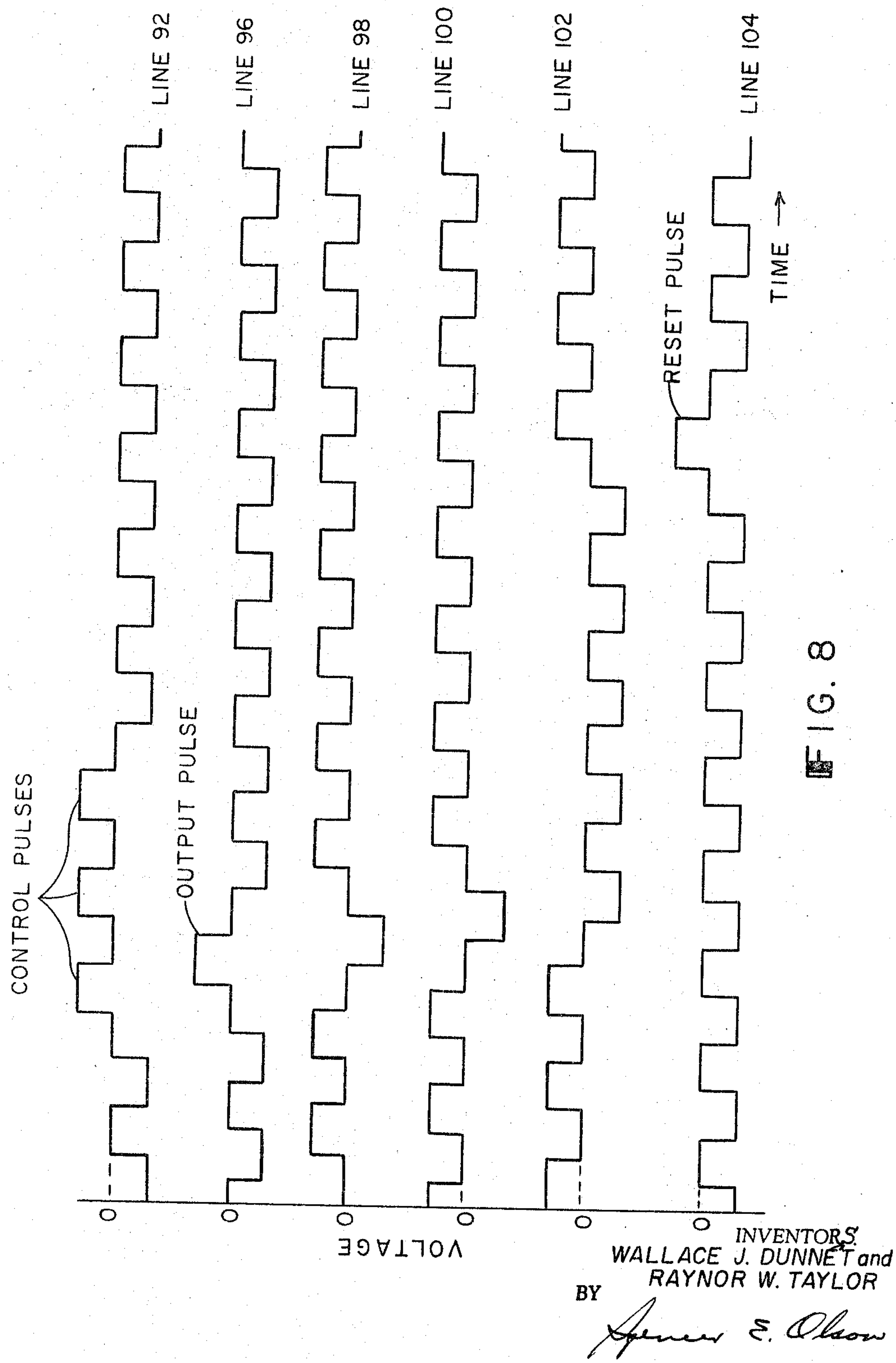
FIG. 8 depicts a series of waveforms produced at various points in the circuit of FIG. 7.

Instead of producing a plurality of pulses in response to a control pulse, it may be desirable in some applications to produce a single pulse in response to a train of one or more control pulses. The transistor one-shot multivibrator is capable of performing a similar function, but has the disadvantage of requiring a narrower input pulse than the width of the pulse which it develops. This function is conveniently performed by locked pair tunnel diode circuits of the types described hereinabove, a suitable arrangement being shown in FIG. 7. The circuit includes a first majority gate 84 having input terminals 92 and 94, an inverter 86 connected from the output terminal of gate 84 to a second majority gate 88, and a flip-flop 90 having one of its input terminals 100 connected to the output terminal of majority gate 88 and its output terminal 102 connected to a third input terminal of gate 84. The waveforms produced at various points int he circuit of FIG. 7 shown in FIG. 8 will help clarify the following explanation of circuit operation.

At all times, negative pulses from a suitable source are applied to line 94, and under normal conditions, negative pulses are also applied to control input line 92 of majority gate 84. Under these conditions, and assuming a positive pulse to be stored in flip-flop 90 and negative pulses to be applied to its reset line 104, majority gate 84 produces negative pulses on its output line 96 which are delayed 90° with respect to the pulses on line 92. These negative pulses are inverted and delayed 90° by inverter 86 and then applied via line 98 to majority gate 88. Gate 88 delays the pulses an additional 90° and transfers it to flip-flop 90 via line 100. With negative pulses being applied to its line 104 and positive pulses to its line 100, flip-flop 90 continues to store a positive signal until a positive signal is applied to control input line 92.

Upon application of the first positive control pulse to its line 92, majority gate 84 produces a positive pulse on line 96 because positive pulses are now being applied to both of lines 92 and 102. Inverter 86 reverses the polarity of this signal and delays at 90° and transfers the resulting delayed negative pulse to majority gate 88 which delays it another 90° and transfers it to flip-flop 90. Since the pulse to inputs 104 and 100 are now both negative, flip-flop 90 produces a negative pulse which is transferred back to the input 102 of majority gate 84. Negative pulses now being applied to both lines 94 and 102 are in the majority and cause gate 84 to produce a negative pulse regardless of whether or not another positive pulse is applied to control line 92. Thus, only one positive pulse is produced on output line 96, and this in response to the application of the first control pulse to input line 92.

This latest negative pulse produced on line 96 is inverted and delayed by inverter 88, delayed further by majority gate 88 and then applied to flip-flop 100. Since negative pulses are still being applied to line 104 and a positive pulse is applied to line 100, flip-flop 90 continues to store a negative pulse, and majority gate 84 likewise continues to produce negative pulses.

In order to prepare the circuit for recognizing the next positive control pulse applied to line 92, a positive reset pulse is applied to reset line 104. Since positive pulses are now applied to both of inputs 104 and 100, flip-flop 90 stores a positive signal and the initial circuit conditions are re-established.

Thus, the circuit of FIG. 7 normally produces a train of negative pulses because negative pulses are applied to two input lines 92 and 94 of majority gate 10 and override the positive pulse applied to input terminal 102. The application of the initial control pulse to input line 92, however, causes the circuit to produce a positive pulse at its output. This pulse is internally inverted and causes flip-flop 90 to produce a negative pulse train which is applied to input line 102 and prevents another positive pulse from being generated at the output upon the application of any additional control pulses until flip-flop 90 is reset by a positive pulse applied to line 104.

The invention is not limited to the specifics of the preceding description and accompanying drawings, but is applicable to a wide range of utility. For example, it may be employed with unbalanced tunnel diode pairs. Another polyphase system could also be used and with the foregoing explanation, it would be within the capability of anyone skilled in the art to make the necessary circuit changes. Consequently, the invention embraces the full scope of the following claims.

What is claimed is:

1. A circuit for generating N consecutive pulses in response to a control pulse in a pulse train, where N may be any number greater than zero, comprising, in combination, a majority gate operative to produce a pulse having the same polarity as the majority of input pulses, a pair of pulse sources connected to said majority gate wherein one of said sources is operative to produce said pulse train including said control pulse having a selected polarity and pulses of opposite polarity when not producing said control pulse and the other of said sources is operative to produce a train of pulses of opposite polarity to said control pulse, pulse storage means for producing said N consecutive pulses operative to store a pulse of the same polarity as its input pulses when all are of the same polarity and to continue storing the same polarity pulse when said input pulses have different polarities, pulse transfer means connected between said storage means and said majority gate for transferring the pulse content of said storage means to said majority gate, an inverter circuit connected between said majority gate and said storage means operative to invert the pulses produced by said majority gate and apply said inverted pulses to said storage means, delay means connected between said majority gate and said storage means operative to store pulses produced by said majority gate for the time required to produce N pulses before applying said pulses to said storage means, and output circuit means connected to said storage means for transferring said N consecutive pulses therefrom.

2. A tunnel diode circuit for producing N consecutive pulses in response to a control pulse, where N may be any number greater than zero, comprising, in combination, a majority gate including a first tunnel diode locked pair operative to produce a pulse having the same polarity as the majority of input pulses, an input circuit connected to said majority gate operative to transfer said control pulse to said majority gate, storage means including a second tunnel diode locked pair connected to a delay line having a length of 135° operative to produce said N pulses, a second delay line having a length of 180° $(2N+1)$ connected between said first majority gate and said storage means operative to store pulses produced by said majority gate for the length of time required to produce said N pulses and to apply said stored pulses to said storage means, an inverter circuit including a third tunnel diode locked pair connected to said first majority gate operative to invert the polarity of pulses generated by said first majority gate, delay means connected between said inverter circuit and said storage means operative to delay the pulses produced by said inverter means and to apply said delayed pulses to said storage means, pulse transfer means connected between said storage means and said first majority gate operative to transfer the pulse content of said storage means to said first majority gate, and output circuit means connected to said storage means for transferring said N pulses therefrom.

3. A tunnel diode circuit for producing a single pulse in response to one or more control pulses in a pulse train wherein said control pulses are of one polarity and the rest of said pulses are of opposite polarity, comprising, in combination, a first majority gate including a first tunnel diode locked pair, input circuit means connected to said first majority gate for applying said pulse train to said first majority gate, storage means including a second tunnel diode locked pair, delay means connecting said first majority gate to said storage means, and means including a second majority gate including a third tunnel diode locked pair connected to an inverter circuit including a fourth tunnel diode locked pair connected between said first majority gate and said storage means.

4. A tunnel diode circuit for producing a single pulse in response to one or more control pulses in a pulse train, wherein said control pulses are of one polarity and the rest of said pulses are of opposite polarity, comprising, in combination, a first majority gate including a first tunnel diode locked pair, input circuit means connected to said first majority gate for applying said train to said first majority gate, storage means including a reset signal, transfer means and a second tunnel diode locked pair connected to said reset means, delay means connecting said first majority gate to said storage means, and means including a second majority gate including a third tunnel diode locked pair connected to an inverter circuit including a fourth tunnel diode locked pair connected between said first majority gate and said storage means.

References Cited by the Examiner

UNITED STATES PATENTS

| | | | |
|---|---|---|---|
| 2,700,696 | 1/1955 | Barker | 307—88.5 |
| 3,097,340 | 7/1963 | Dobbie | 307—88.5 |
| 3,156,833 | 11/1964 | Cloud et al. | 307—88.5 |
| 3,198,957 | 8/1965 | Husimi et al. | 307—88.5 |
| 3,223,930 | 12/1965 | Haile | 307—88.5 |

ARTHUR GAUSS, *Primary Examiner.*

J. S. HEYMAN, *Assistant Examiner.*